United States Patent
Family (10) Patent No.: US 12,337,962 B2
(45) Date of Patent: Jun. 24, 2025

(54) FLIGHT CONTROL SURFACE

(71) Applicant: AIRBUS OPERATIONS LIMITED, Bristol (GB)

(72) Inventor: Oliver Family, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 0 days.

(21) Appl. No.: 18/475,084

(22) Filed: Sep. 26, 2023

(65) Prior Publication Data
US 2024/0101244 A1    Mar. 28, 2024

(30) Foreign Application Priority Data
Sep. 27, 2022 (GB) .................................... 2214131

(51) Int. Cl.
| | |
|---|---|
| *B64C 3/50* | (2006.01) |
| *B64C 9/04* | (2006.01) |
| *B64C 9/10* | (2006.01) |
| *B64C 9/12* | (2006.01) |

(52) U.S. Cl.
CPC ................. *B64C 3/50* (2013.01); *B64C 9/04* (2013.01); *B64C 9/10* (2013.01); *B64C 9/12* (2013.01)

(58) Field of Classification Search
CPC .... B64C 3/50; B64C 5/10; B64C 9/04; B64C 9/10; B64C 9/12
See application file for complete search history.

(56) References Cited

U.S. PATENT DOCUMENTS

| | | |
|---|---|---|
| 2,271,763 A | 2/1942 | Fowler |
| 2,369,832 A | 2/1945 | Klose |
| 2,438,309 A | 3/1948 | Zimmerman |
| 2,936,975 A | 5/1960 | Strang et al. |
| 3,831,885 A | 8/1974 | Kasper |
| 4,479,620 A | 10/1984 | Rogers et al. |
| 5,803,408 A | 9/1998 | Gast |
| 5,913,492 A * | 6/1999 | Durandeau ............... B64C 9/10 244/76 A |
| 11,059,569 B1 * | 7/2021 | Nguyen .................... B64C 3/50 |
| 2007/0185628 A1 | 8/2007 | Delaplace et al. |
| 2009/0146003 A1 * | 6/2009 | Sheahan, Jr. ............. B64C 9/10 244/99.14 |
| 2017/0060141 A1 | 3/2017 | Leopold et al. |

(Continued)

FOREIGN PATENT DOCUMENTS

| | | |
|---|---|---|
| GB | 595299 A | 12/1947 |
| WO | 2019104421 A1 | 6/2019 |

OTHER PUBLICATIONS

Search Report for GB2214131.1 dated Mar. 22, 2023, 5 pages.
Extended European Search Report for Application No. EP 23197104.5, Seven pages, dated Feb. 23, 2024.

*Primary Examiner* — Rodney A Bonnette
(74) *Attorney, Agent, or Firm* — Nixon & Vanderhye P.C.

(57) ABSTRACT

An aircraft wing with an array of moveably flight control surfaces is disclosed. Each flight control surface includes a trailing edge with a moveable tab attached to the flight control surface trailing edge. A flight control system coupled to a flight control surface drive system which moves the flight control surfaces; a tab drive system which moves the moveable tabs and one or more aircraft angle of attack sensors. The flight control system stores a set of angular deflections to deflect the tabs upwardly when the angle of attack reaches a threshold.

15 Claims, 5 Drawing Sheets

(56) References Cited

U.S. PATENT DOCUMENTS

| | | |
|---|---|---|
| 2020/0115040 A1* | 4/2020 | Giannini .................. B64C 9/18 |
| 2021/0261238 A1 | 8/2021 | Peterson et al. |
| 2022/0041268 A1 | 2/2022 | Ivanco et al. |

* cited by examiner

FLIGHT CONTROL SURFACE

CROSS RELATED APPLICATION

This application claims priority to United Kingdom Patent Application GB 2214131.1, filed Sep. 27, 2022, the entire contents of which is hereby incorporated by reference.

FIELD OF THE INVENTION

The present invention relates to an aircraft wing with an array of moveable flight control surfaces with moveable tabs attached to the flight control surface trailing edge; a method of operating an array of moveable flight control surfaces with moveable tabs attached to the flight control surface trailing edge and a method of conducting a flight test campaign for an aircraft.

BACKGROUND OF THE INVENTION

If an aircraft is flown outside of its usual flight envelope, it can enter a stall. The onset of a stall is affected by a great many different factors and as such the exact onset and speed of spread of stall can be difficult to predict.

As stalling relates to the separation of flow over the wing surface, stalling is more likely to occur at higher angles of attack of the wings. The angle of attack may be influenced by multiple factors, such as altitude, flap position, aircraft speed, weight, aspect ratio, and wing sweep.

It is desirable to mitigate the onset of stall over the aircraft wings.

SUMMARY OF THE INVENTION

A first aspect of the invention provides an aircraft comprising a wing with a wing leading edge and a wing trailing edge, and an array of moveable flight control surfaces attached along the wing trailing edge, each flight control surface having a trailing edge with a moveable tab attached at the flight control surface trailing edge, one or more flight control surface drive systems for moving the flight control surfaces with respect to the wing trailing edge, tab drive systems for moving the tabs with respect to the flight control surface trailing edges, one or more aircraft angle of attack sensors and a flight control system coupled to the one or more aircraft angle of attack sensors, the one or more flight control surface drive systems, and the tab drive systems, and wherein the flight control system stores a set of angular deflections for the tabs for deflecting at least some of the tabs upwardly with respect to their respective flight control surfaces when the aircraft angle of attack reaches a threshold.

This arrangement helps mitigate the onset of stall in an aircraft. This is provided by the upward deflection of the moveable tabs which reduces the load on the wing near where stall begins to occur (i.e. a stalling location).

The angle of attack sensor outputs an angle at which the aircraft is pointing relative to the oncoming freestream airflow. The freestream airflow (also known as relative airflow) is the speed and direction of oncoming air moving past the aerofoil.

A set of angular deflections for the tabs are set for a specific angle of attack threshold. This means that when the angle of attack threshold is reached, the tabs move to their predetermined position. The tab deflections therefore expand the operating envelope of the aircraft without the risk of wing stall occurring.

The operating envelope (or flight envelope) of an aircraft describes the flight limitations of the aircraft 1. This may be dependent on the maximum speed, altitude, load factor and other design parameter of the aircraft. The operating envelope therefore varies for different aircraft designs.

The angular deflection of the moveable tab is an angular/angle of rotation that the tab moves to deviate upwards in relation to the flight control surface.

The threshold is a numerical value that indicates an angle of attack the aircraft can reach without stalling. This threshold angle of attack is less than the stall angle of attack of the aircraft. The threshold is preferably experimental data that is obtained from optimisation trials.

The flight control surfaces may be trailing edge flaps, flaperons or ailerons.

The tab drive systems are operable to move the tabs at an angular rate which is substantially faster than an angular rate at which the one or more flight control surface drive systems is capable of moving the flight control surfaces.

The angular rate is the rotational velocity of the tabs and the flight control surface. The moveable tabs are generally smaller than the flight control surfaces. The moveable tabs undergo relatively less loading relative to the flight control surfaces, so they can be deployed quickly to mitigate the onset of stall.

The set of angular deflections for the tabs stored by the flight control system may be configured to change the wing loading to improve the stall behaviour of the wing by either i) increasing the stalling angle of attack of the aircraft or ii) the maximum lift coefficient of the wing or iii) moving wing stall to a more benign location on the wing at the threshold aircraft angle of attack.

A benign location at the wing is an area which is less susceptible to stalling.

The set of angular deflections for the tabs stored by the flight control system may be obtained through flight test of the aircraft during a stall optimisation campaign.

A stall optimisation campaign is an undertaking to refine the flight envelope of the aircraft, in particular where the flight envelope is limited by the onset of stall.

The onset of stall is determined by the design of the aircraft, but may also be determined by factors such as speed of the aircraft, altitude and angle of attack.

The set of angular deflections for the tabs may produce different tab deflection angles for the tabs across the wing.

This allows the tabs to be optimised for the different stall locations along the wing.

The wing stall may typically progress forward from one or more locations across the trailing edge of the wing, creating one or more regions of separated flow over the wing at a high angle of attack. Deploying the tabs may unload the wing in these locations sufficiently to substantially inhibit the onset of stall at those locations at the threshold angle of attack. The tab deployment may have the effect of moving the onset of stall to a more benign location on the wing where the onset of stall has limited effect on wing stall, or the tab deployment may have the effect that the onset of stall may occur at the same location but at a higher angle of attack. Increasing the angle of attack at which the onset of stall occurs may increase the stalling angle of attack of the aircraft or the maximum lift coefficient of the wing.

The wing may be a swept transonic wing.

The aircraft may be a transport aircraft.

A further aspect of the invention provides a method of operating an aircraft having a wing with a wing leading edge and a wing trailing edge, and an array of moveable flight control surfaces attached along the wing trailing edge, each flight control surface having a trailing edge with a moveable tab attached at the flight control surface trailing edge, the method comprising moving at least some of the tabs to achieve differential upward angular deflections of the tabs with respect to their respective flight control surfaces when the aircraft angle of attack reaches a threshold according to a predetermined set of angular deflections for the tabs.

The tabs may be moved at an angular rate which is substantially faster than an angular rate at which the one or more flight control surfaces is capable of moving.

A further aspect of the invention provides a method of conducting a flight test campaign for an aircraft having a wing with a wing leading edge and a wing trailing edge, and an array of moveable flight control surfaces attached along the wing trailing edge, each flight control surface having a trailing edge with a moveable tab attached at the flight control surface trailing edge, the method comprising moving at least some of the tabs to achieve differential upward angular deflections of the tabs with respect to their respective flight control surfaces to change the wing loading, and recording a set of angular deflections for the tabs when the stall behaviour of the wing is optimised at a selected aircraft angle of attack.

The stall behaviour optimisation may be based on the following criteria: i) maximising a stalling angle of attack of the aircraft or ii) maximising the lift coefficient of the wing or iii) moving wing stall to a most benign location on the wing.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
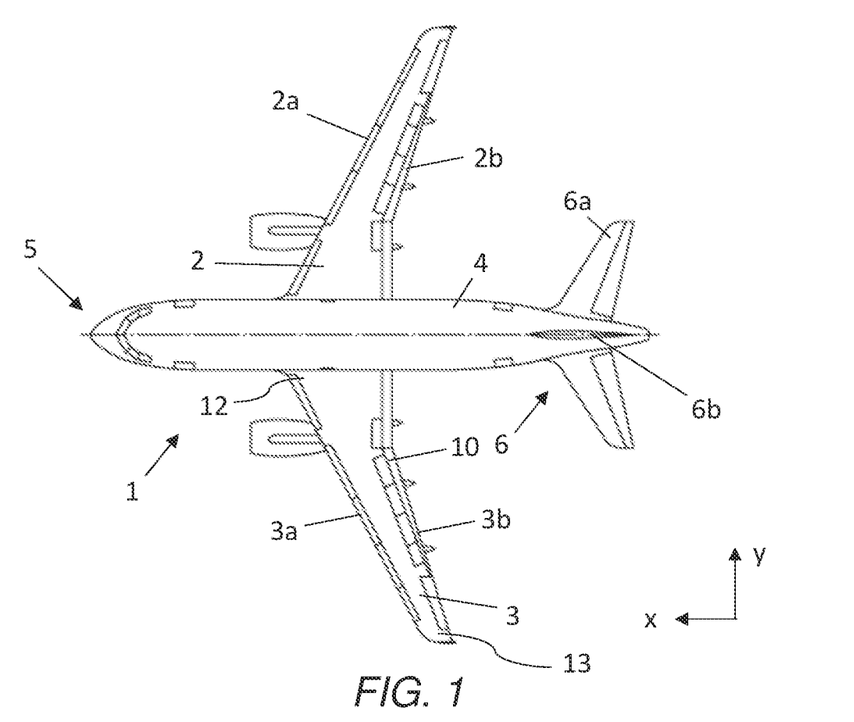
FIG. 1 shows an aircraft.

FIG. 1 shows an aircraft 1 with port and starboard fixed wings, 2, 3, a fuselage 4 and a nose end 5 and a tail end 6 including horizontal and vertical stabilising surfaces 6a, 6b. Each wing has a leading edge 2a, 3a and trailing edge, 2b, 3b. The aircraft 1 is a typical transport aircraft.

Figure 2:
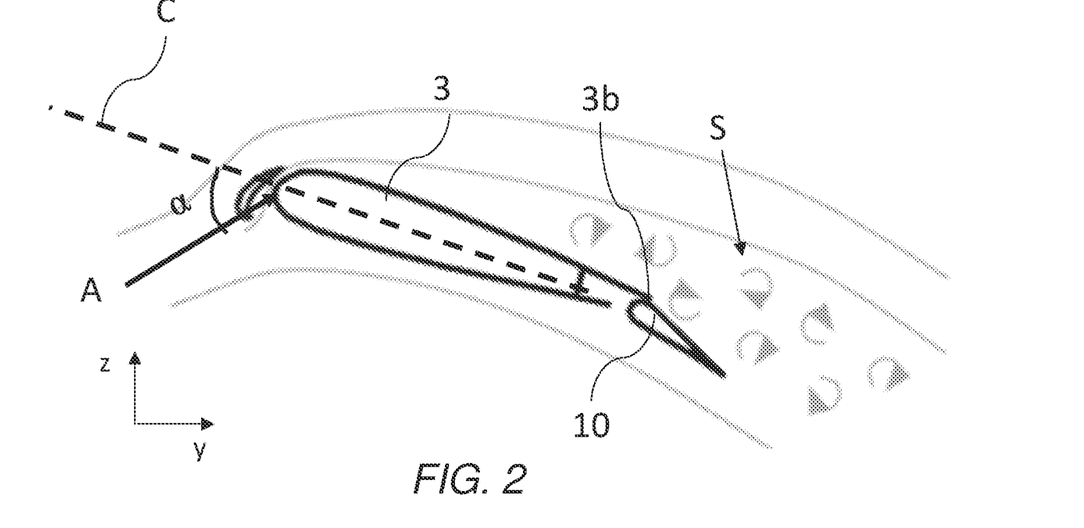
FIG. 2 shows a cross-sectional view of a typical aircraft wing.

The axes shown in FIGS. 1 and 2 represent the usual reference orthogonal axes of the aircraft 1. The X-axis defines the longitudinal fore-aft direction of the aircraft; the Y-axis defines the spanwise direction and the Z-axis defines the vertical up-down direction of the aircraft.

Each wing 2,3 of the aircraft has a cantilevered structure with a length extending in a spanwise direction from a root 12 to a tip 13. The wings 2,3 are aft swept transonic wings. The root 12 is joined to the aircraft fuselage 4. The wing portion near the root 12 is the inboard region. The wing portion near the tip 13 is called the outboard region. The wings 2,3 have a leading edge 2a, 3a and a trailing edge 2b, 3b respectively. The wings 2,3 also has a chord extending in a chordwise direction from a leading edge 2a,3a to a trailing edge 2b,3b.

The wings 2,3 are aft swept and have a number of aerodynamic flight control surfaces 10. These flight control surfaces 10 may be ailerons, elevator, rudders, spoilers, flaps, slats or air brakes. These are typically located on the wing 2,3 or on the horizontal stabiliser 6a or vertical stabiliser 6b of the aircraft 1.

The flight control surfaces 10 are adjustable during flight to adjust the aircraft flight altitude or wing performance by controlling the airflow over the wings 2,3. For example, ailerons may be used to tilt the wings 2,3 to control the roll of the aircraft, while leading edge devices (such as, slats, flaps) may be used to increase the lift coefficient of the wings 2,3 at lower speed (such as take-off). When the flight control surfaces 10 are used to manoeuvre the aircraft 1 into different flight regimes, the aircraft 1 operates within the flight envelope where wing stall does not occur (although the onset of stall may be close or just occurring in limited regions of the wing). The angle of attack $\alpha$ is the angle between the chord C of the wing 3 and the oncoming airflow (as shown in FIG. 2).

Stalling is the significant reduction in lift over the wings 2,3 and has significant effects on the flight of the aircraft 1. Stalling is a difficult phenomenon to predict as multiple factors affect the onset and spread of stall over the wings 2,3. FIG. 2 shows a cross-sectional view of a standard aircraft wing 3 with a flight control surface 10. During flight, wing stall S typically originates locally at the trailing edge 3b of the wing 3 before moving forward and spreading spanwise across the wing 3. As shown, the stall S disrupts the flow of oncoming air A over the wing 3, creating a region of the aerofoil with no lift.

Stalling is more likely to occur at higher angles of attack $\alpha$. If the aircraft 1 flies beyond an angle of attack threshold T, the onset of stall is more likely to occur at one or more locations on the wing. The angle of attack $\alpha$ may be influenced by multiple factors, such as altitude, flap position, aircraft speed, weight, aspect ratio, and wing sweep. As described earlier, if the aircraft 1 flies outside the flight envelope, particularly at high angles of attack and/or low speed, wing stall is likely to occur. The flight envelope may be at least partially limited by a stall angle of attack for a given airspeed, which may be above the angle of attack threshold T.

Figure 3:
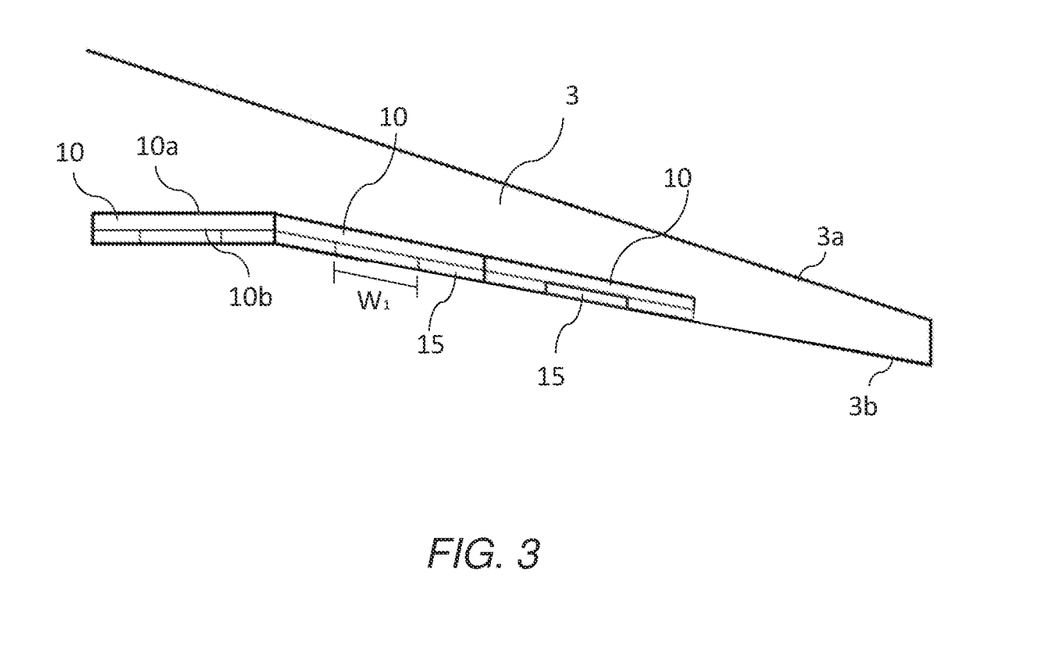
FIG. 3 shows a top view of an aircraft wing with moveable tabs according to the present disclosure.

FIG. 3 shows a plan view of a wing 3 with exemplary flight control surfaces 10 and moveable tabs 15 arrangement. As shown, the wing 3 has an array of moveable flight control surfaces 10 attached along the trailing edge 3b of the wing 3. Each flight control surface has a leading edge 10a and a trailing edge 10b. The flight control surfaces 10 may be trailing edge flaps, flaperons or ailerons.

Figure 4:
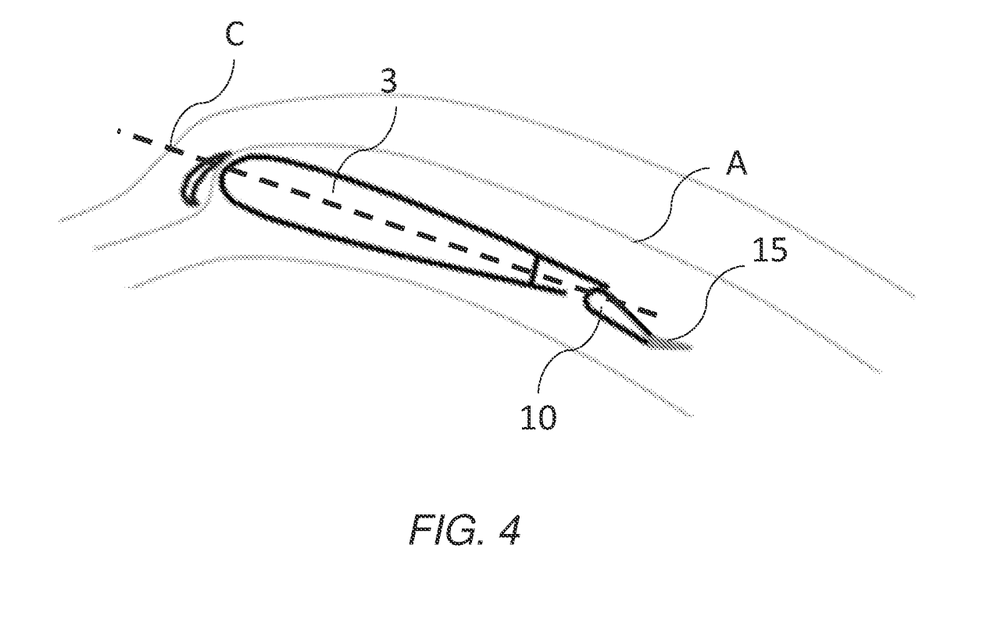
FIG. 4 shows a cross-sectional view of an aircraft wing with moveable tabs according to the present disclosure.

Three exemplary moveable tabs 15 are attached to the trailing edge 10b of each flight control surface 10 in FIG. 3. It will be understood that any number of tabs 15 may be attached to the trailing edge 10b of the flight control surface. For example, each flight control surface 10 may only have one tab 15. As shown more clearly in FIGS. 4-5C, each moveable tab 15 has a generally aerofoil shaped cross-section with a first end 16 that is thicker than a second end 18. The moveable tabs 15 are attached to the trailing edge 10b of the flow control surface 10 at the first end 16. The second end 18 of the moveable tab is a free end. The wedge shape of the moveable tab 15 largely corresponds to the wedge shape of the flow control surface 10 and provides an aerodynamic surface for oncoming airflow A to pass over.

Figure 5A:
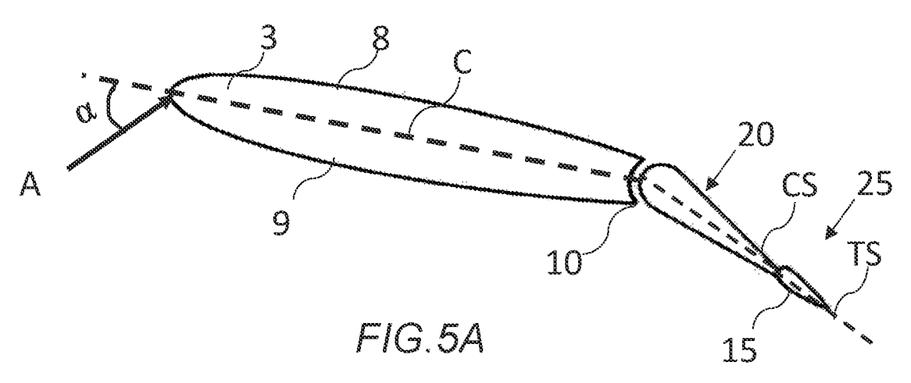
FIG. 5A shows a cross-sectional view of an aircraft wing with an exemplary moveable tab in an undeployed state.

As described earlier, each flight control surface 10 may be adjusted during flight to alter airflow over the wing 3. For example, FIG. 5A shows the flight control surface 10 in a first position 20. In the first position 20, the centre of the flight control surface (denoted by dashed centre line CS) is not substantially in line with the chord C of the wing 3. The angle between the chord C of the wing 3 and the centre line CS of the flight control surface 10 in the second position 22 may be any suitable angle, such as 30° (in which case the trailing edge 10b of the flight control surface 10 extends upward relative to the trailing edge 3b of the wing 3). The wing 3 is at an angle of attack α greater than 0° in FIGS. 5A and 5B.

The flight control surface 10 may alternatively be in line with the chord C of the wing. In that instant, the angle between the chord C of the wing 3 and the centre line CS of the flight control surface 10 is 0°. Of course, it will be understood that the flight control surface 10 may move between a range of different angles.

The flight control surface(s) 10 are capable of being moved through a range of angles by a flight control drive system 30. The flight control drive system 30 enables the flight control surface(s) 10 move relative to the trailing edge 3b of the wing (shown schematically in FIG. 6). The flight control drive system 30 may be any suitable mechanism, such as hinges, link/track mechanisms, four bar linkages, hooked track supports or hydraulic actuation systems to deploy the moveable flight control surfaces 10.

The angular rate (AR) is the rate at which the flight control surface drive system 30 deploys the flight control surface(s) 10. The angular rate (AR) is the speed at which the flight control surface(s) 10 moves between a first position 20 a second position 22 relative to the trailing edge 3b of the wing 3. The flight control surface(s) 10 deploy at a relatively slow angular rate (AR) because the flight control surface(s) 10 may act as load-bearing structures. Deploying the flight control surface(s) at a relatively fast angular rate (AR) increases the risk of damage to the flight control surface(s) (10) as well as causing rapid alterations to the flight characteristics of the aircraft 1.

A singular flight control surface drive system 30 may be used to control the deployment of a single flight control surface 10. Alternatively, a single flight control surface may be used to adjust multiple flight control surfaces 10 (shown schematically in FIG. 6). The dotted lines show the arrangement in which each flight control surface 10 is adjusted by a dedicated (i.e. separate) flight control surface drive system 30. The one or more flight control surface drive systems 30 are coupled to a flight control system 100.

Figure 6:
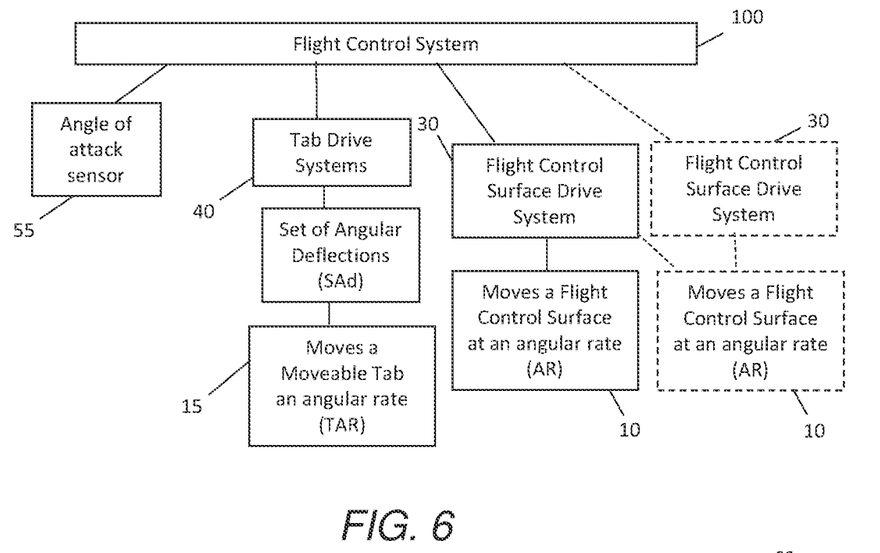
FIG. 6 is a flow chart of a flight control system.

The flight control system 100 is an electronic control system within the aircraft 1. The flight control system 100 may be coupled to multiple other systems within the aircraft. The flight control system 100 may also be coupled to an interface which allows an operator to control the operation of the control systems coupled to the flight control system 100.

The flight control system 100 may also be used to deploy each flight control surface 10 independently from neighbouring flight control surfaces. Alternatively, the flight control system 100 may be used to deploy each flight control surface 10 in conjunction with neighbouring flight control surfaces 10.

Similarly, the moveable tab(s) may be adjusted during flight to alter airflow over the wing 3. FIG. 5A shows the moveable tab 15 in a first, undeployed position 25. In the first position, the centre of the moveable tab (denoted by dashed centre lines TS) in line with the centre of the flight control surface (CS).

Figure 5B:
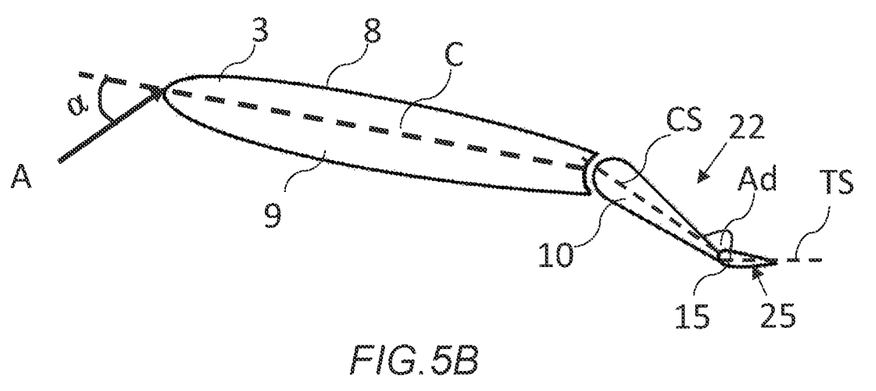
FIG. 5B shows a cross-sectional view of an aircraft wing with an exemplary moveable tab in a deployed state.
Figure 5C:
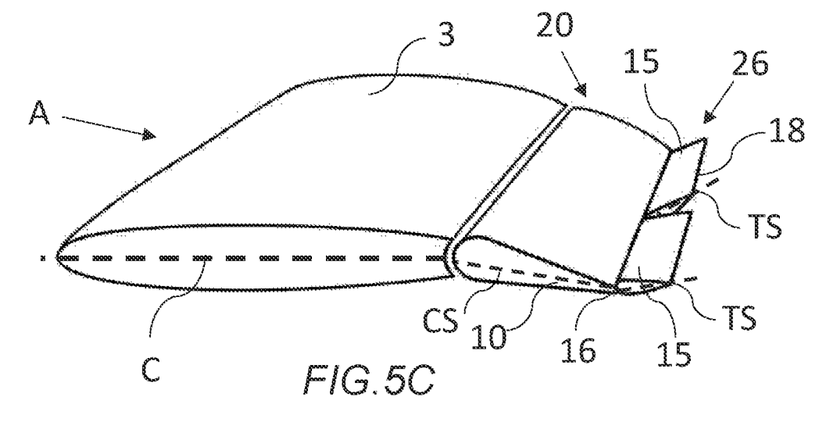
FIG. 5C shows an isometric view of an aircraft wing with two moveable tabs deployed at different angular deflections.

The moveable tab(s) may be independently actuated relative to their respective flight control surface(s) 10. As shown in FIGS. 5B and 5C, the moveable tab(s) 15 deflect generally upwards in relation to the flight control surface(s) 10. The deflection of the moveable tab(s) 15 is determined by the angular deflection Ad of the centre of the moveable tab TS relative to the centre of the flight control surface CS. For example, FIG. 5B shows the moveable tab(s) in a second position 26 with angular deflection Ad of ~30°. Similarly, FIG. 5C an isometric view of the wing 3 with two exemplary moveable tabs 15 attached to the flight control surface 10. Both moveable tabs 15 are in the second position 26. As shown, the flight control surfaces have different angular deflections because the centre of the moveable tabs TS are at different angles. In the second position 26, the second end 18 of the moveable tab 15 is deflected upwards (in the vertical Z direction of the aircraft 1) in relation to first end 16 of the tab 15 that is connected to the trailing edge 10b of the flight control surface 10.

It will be understood that the moveable tab(s) may be deflected through different angular deflections Ad during flight of the aircraft 1. For example, during lift off, the aircraft 1 may have different angles of attack α. If the angle of attack α reaches the threshold T, the tabs 15 will deploy (based on the pre-determined angular deflection Ad). Deploying the tabs 15 at the angle of attack threshold T extends the stall angle of attack where wing stall is likely to occur. Increasing this stall angle of attack extends the flight envelope of the aircraft 1. Extending the flight envelope by increasing the stall angle of attack may provide advantages in terms of increased take of weight, decreased take of speed, etc. which may improve the operating capabilities of the aircraft. The moveable tab(s) 15 are capable of being deflected upwards through a range of angular deflections Ad by a tab drive system 40.

The tab drive system 40 may be any suitable mechanism for fast deployment of the moveable tab(s) 15, such as linear actuators or hydraulic actuation systems. The tab drive system 40 is used to upwardly deflect the moveable tab(s) 15 with respect to their respective flight control surfaces 10.

The tab drive system 40 deploys the moveable tab(s) at an angular rate (TAR). The tab angular rate (TAR) is the speed at which the moveable tabs 15 deflects from a first position 25 and a second position 26, or between a second position 26 and another second position 26. The tab drive system 40 therefore deploys the moveable tab(s) 15 to a specific angular deflection Ad. The tab drive system 40 is operable to move the moveable tab(s) at a tab angular rate (TAR) that is substantially faster than the angular rate AR at which the flight control surface drive system 30 is capable of moving the flight control surfaces 10. The moveable tab(s) 15 can deploy quicker than the flight control surfaces 10. The moveable tab(s) are generally smaller than the flight control surfaces 10. The moveable tab(s) 15 undergo relatively less aerodynamic loading than the flight control surfaces, and therefore can be deployed quickly to mitigate the onset of stall over the wings 2,3. The moveable tab(s) may also be deployed quicker to ensure that the onset of stall does not quickly progress to wing stall.

The moveable tab(s) 15 act to alter the wing loading on the wing 3 by either increasing the stall angle of attack of the aircraft (i.e. the angle of attack α at which the aircraft will stall) or by increasing the maximum lift coefficient of the wing 3. Alternatively, the tabs 15 may move the onset of stall to a more benign location on the wing 3. By moving the onset of stall to a more benign location (i.e. an area of the wing that is less susceptible to stalling) the stall is less likely to rapidly progress over the wing.

A singular tab drive system 40 may be used to control the deployment of a single moveable tab 15. However, a single tab drive system is preferably used to control the deployment of all the moveable tab(s) arranged on the wing 3. Each moveable tab 15 may be independently adjusted with respect to their respective flight control surfaces 10 via the tab drive system 40. The tab drive system 40 may also be used to independently deflect adjacent moveable tab(s) 15.

The flight control system 100 is also coupled to the tab drive system 40, as shown in FIG. 6. Similar to the operation of the flight control surface drive system 30, the flight control system 100 controls the movement of the moveable tab(s) 15 via the tab drive system. The flight control system 100 also may control which moveable tabs 15 are deployed by which desired angular deflection Ad, the speed at which the tabs 15 are deployed. The flight control system 100 can therefore be used deflect a number of moveable tabs 15 to a desired angular deflection Ad.

The desired angular deflection Ad may be pre-determined and stored in the flight control system 100 as a set of angular deflections SAd. It will be apparent that the set of angular deflections SAd may be stored in any suitable electronic storage system. The set of angular deflections SAd may be stored for all the moveable tab(s) on the wing 3. The Ad of the tab(s) 15 may be different when the angle of attack α threshold T is reached. Preferably, the stored set of angular deflections SAd provide different desired angular deflections Ad for the moveable tab(s) depending on the angle of attack α of the wing 3.

This arrangement provides a set of angular deflections SAd which may be used to change the wing loading behaviour on the wing 3 to mitigate the onset of stall at the threshold angle of attack T. The set of angular deflections SAd may result in all the moveable tabs 15 deflection by the same angular deflection, for example, by 30°. However, the set of angular deflections SAd may result in neighbouring moveable tabs 15 to be deflected by different angles. The flight control system 100 may store multiple sets of angular deflections SAd for different angles of attack α and flight regimes.

In order to determine the angle of attack α of the wing 3 during flight, the aircraft 1 may further comprise one or more angle of attack sensors 55. The angle of attack sensors 55 may be any suitable sensor, such as transducers, differential pressure sensors or inertial reference indicators. The sensors 55 are used to measure and calculate the angle of attack α of the wings 2,3 and may be placed at any suitable location on the aircraft, such as the wings or the fuselage 4.

The angle of attack sensors 55 are coupled to the flight control system 100, as shown schematically in FIG. 6. The flight control system 100 uses the angle of attack sensors 55 to monitor when the angle of attack α reaches the threshold T. Once the angle of attack α reaches the threshold T, the flight control system 100 deploys the moveable tabs 15 using the set of angular deflections SAd. The threshold T may be near the stall angle of attack α of the aircraft 1. The flight control system 100 may automatically deploy the tabs 15 at a threshold T or may require user input to deploy the moveable tabs 15.

The stored angular deflections SAd and threshold T may be pre-programmed into the flight control system 100. These values may be calculated or predicted using features of the aircraft 1, such as the weight, wing profile etc. For example, a modelling may be used to predict the preferred angular deflections Ad of the moveable tab (15). Preferably, the stored angular deflections SAd and the threshold T is optimised based on experimental data, as the stall behaviour of the wings 2,3 is difficult to predict and calculate in isolation. The set of angular deflections SAd may be obtained through a flight test 60 of the aircraft 1 during a stall optimisation campaign 61 as described below and shown in FIG. 7.

Figure 7:
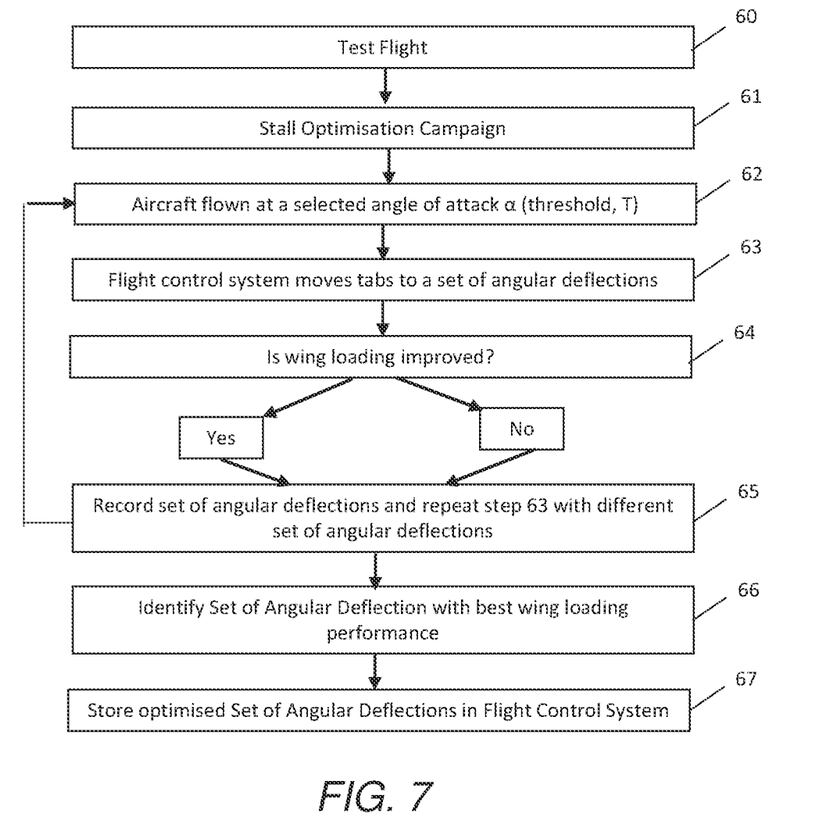
FIG. 7 shows a flow chart for a method of obtaining optimised angular deflections in the flight control system.

First, the aircraft 1 is flown through a flight test 60. Part of the flight test 60 is specifically intended to act as a stall optimisation campaign 61 to explore the stall thresholds T. The aircraft 1 is then flown through a range of angle of attacks a to determine when the aircraft 1 is likely to exhibit stalling behaviour and subsequently stall.

At step 62, the aircraft 1 is flown at a threshold angle of attack, T is (i.e. a chosen angle of attack). The flight control system 100 is used to deploy the tabs 15 to a variety of sets of angular deflections Ad at step 63. The wing loading performance is analysed at step 64 before being recorded at step 65.

The aircraft 1 is then flown at the same threshold angle of attack again with a different set of angular deflections SAd. Once a number of sets of angular deflections SAds are collected, the set of angular deflections with the best wing loading performance is chosen at step 66. This provides an optimised set of angular deflections SAd, which is then stored in the flight control system 100 at step 67.

This process may be repeated for multiple thresholds angles of attack, until a threshold T is identified where the set of angular tab deflections is optimised for the aircraft stall behaviour. The stall optimisation campaign 61 therefore provides a set of angular deflections Ad for the tabs to deploy at the threshold T angle of attack which optimises the aircraft stall behaviour. This optimisation may extend the flight envelope of the aircraft.

Figure 8:
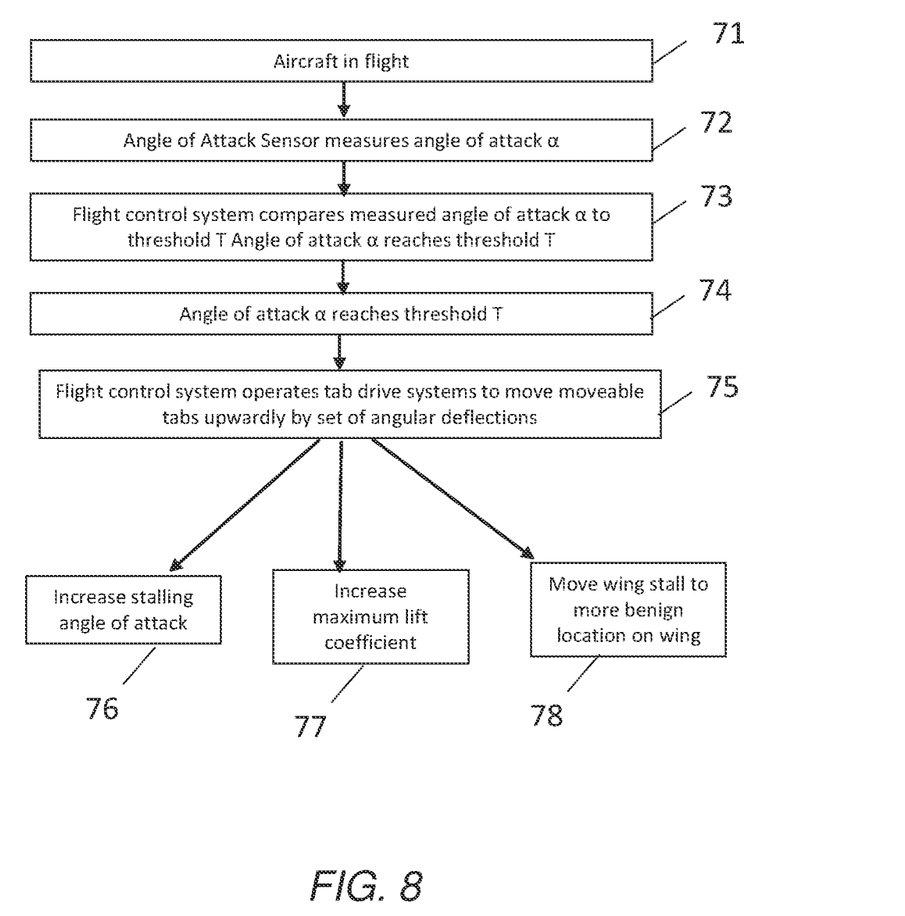
FIG. 8 shows a flow chart of a method of deploying the tabs in the tab control system.

The method of mitigating stall in an aircraft 1 will now be described in reference to FIG. 8. First, the aircraft 1 is in flight in step 71. The angle of attack sensors 55 measure and calculate the angle of attack α of the wings 2,3 during flight and communicate to the flight control system 100 at step 72. The flight control system 100 compares the measured angle of attack α against a threshold T at step 73. When the angle of attack α reaches the threshold T in step 74, the flight control system 100 moves at least some of the tabs 15 to achieve differential upward angular deflections of the tabs 15 by a predetermined set of angular deflections SAd in step 75.

The moveable tabs 15 act to mitigate the onset of stall by one or more of three main mechanisms: by increasing the stalling angle of attack (step 76); by increasing the maximum lift coefficient (step 77) or by moving the onset of stall to a more benign location on the wing (step 78). Of course, the moveable tabs may mitigate the onset of stall by all three mechanisms in various combinations. This helps prevent stalling by locally changing the loading of the wings 2,3.

The flight control system 100 may also command the flight control drive system 30 to move at least one of the flight control surfaces 10. However, as the tab drive system 40 moves at an angular rate faster TAR than an angular rate AR at which the one or more flight control surfaces 10 is capable of moving, the tabs 15 act to mitigate the onset of stall.

As the wings 2,3 are similar in construction, the wing 2 will have similarly arranged flight control surfaces and moveable tabs 15 for symmetry with wing 3. While only one exemplary flight control surface 10 and corresponding moveable tab 15 is described in relation to FIGS. 5A-5C, it will be understood that there may be multiple flight control surfaces 10 and moveable tabs 15 arranged on the wing 3.

The described arrangement provides a reactive system that can help mitigate the onset of stall on the aircraft 1. Using a set of stored angular deflection SAd allows the moveable tabs 15 to be deployed whenever the sensors 55 reach the threshold T. This provides a system that automatically deploys the moveable tabs 15 in response to a change in the angle of attack. Furthermore, by optimising the angular deflections Ad of the tabs 15, the aircraft 1 will be able to mitigate the onset of stall more effectively and easier than previous arrangements.

By optimising the angular deflections Ad by using data obtained from a flight test campaign results in a more accurate system which can be tailored to different sizes and configurations of aircraft.

The described arrangement can improve the flight envelope of the aircraft 1 at high angles of attack α without stalling of the aircraft.

Where the word 'or' appears this is to be construed to mean 'and/or' such that items referred to are not necessarily mutually exclusive and may be used in any appropriate combination.

Although the invention has been described above with reference to one or more preferred embodiments, it will be appreciated that various changes or modifications may be made without departing from the scope of the invention as defined in the appended claims.

The invention claimed is:

1. An aircraft comprising:
    a wing with a wing leading edge and a wing trailing edge, and an array of moveable flight control surfaces attached along the wing trailing edge, each flight control surface having a trailing edge with a moveable tab attached at the flight control surface trailing edge;
    one or more flight control surface drive systems for moving the flight control surfaces with respect to the wing trailing edge;
    tab drive systems for moving the tabs with respect to the flight control surface trailing edges;
    one or more aircraft angle of attack sensors; and
    a flight control system coupled to the one or more aircraft angle of attack sensors, the one or more flight control surface drive systems, and the tab drive systems, and
    wherein the flight control system stores a set of angular deflections for the tabs for deflecting at least some of the tabs upwardly with respect to their respective flight control surfaces when the aircraft angle of attack reaches a threshold.

2. An aircraft according to claim 1, wherein the flight control surfaces are trailing edge flaps, flaperons or ailerons.

3. An aircraft according to claim 1, wherein the tab drive systems are operable to move the tabs at an angular rate which is faster than an angular rate at which the one or more flight control surface drive systems is capable of moving the flight control surfaces.

4. An aircraft according to claim 3, wherein the wing stall progresses forward from the trailing edge of the wing.

5. An aircraft according to claim 1, wherein the set of angular deflections for the tabs stored by the flight control system is configured to change the wing loading to improve the stall behaviour of the wing by either i) increasing the stalling angle of attack of the aircraft or ii) the maximum lift coefficient of the wing or iii) moving wing stall to a more benign location on the wing at the threshold aircraft angle of attack.

6. An aircraft according to claim 1, wherein the set of angular deflections for the tabs stored by the flight control system has been obtained through flight test of the aircraft during a stall optimisation campaign.

7. An aircraft according to claim 1, wherein the set of angular deflections for the tabs produce different tab deflection angles for the tabs across the wing.

8. An aircraft according to claim 1, wherein the wing is a swept transonic wing.

9. An aircraft according to claim 1, wherein the aircraft is a transport aircraft.

10. A method of operating an aircraft having a wing with a wing leading edge and a wing trailing edge, and an array of moveable flight control surfaces attached along the wing trailing edge, each flight control surface having a trailing edge with a moveable tab attached at the flight control surface trailing edge, the method comprising:
    moving at least some of the tabs to achieve differential upward angular deflections of the tabs with respect to their respective flight control surfaces when the aircraft angle of attack reaches a threshold according to a predetermined set of angular deflections for the tabs.

11. A method according to claim 10, wherein the tabs are moved at an angular rate which is faster than an angular rate at which the one or more flight control surfaces is capable of moving.

12. A method according to claim 10, wherein the aircraft comprises a wing with a wing leading edge and a wing trailing edge, and an array of moveable flight control surfaces attached along the wing trailing edge, each flight control surface having a trailing edge with a moveable tab attached at the flight control surface trailing edge;
    one or more flight control surface drive systems for moving the flight control surfaces with respect to the wing trailing edge;
    tab drive systems for moving the tabs with respect to the flight control surface trailing edges;
    one or more aircraft angle of attack sensors; and
    a flight control system coupled to the one or more aircraft angle of attack sensors, the one or more flight control surface drive systems, and the tab drive systems, and
    wherein the flight control system stores a set of angular deflections for the tabs for deflecting at least some of the tabs upwardly with respect to their respective flight control surfaces when the aircraft angle of attack reaches a threshold.

13. A method of conducting a flight test campaign for an aircraft having a wing with a wing leading edge and a wing trailing edge, and an array of moveable flight control surfaces attached along the wing trailing edge, each flight control surface having a trailing edge with a moveable tab attached at the flight control surface trailing edge, the method comprising:
    flying the aircraft through a range of angle of attack:
    moving at least some of the tabs to achieve differential upward angular deflections of the tabs with respect to their respective flight control surfaces to change the wing loading;
    analysing and recording the wing loading performance;
    recording a set of angular deflections for the tabs when the wing loading performance is optimised at a selected aircraft angle of attack; and, recording the set of angular deflections for the selected aircraft angle of attack.

14. A method according to claim 13, wherein the stall behaviour optimisation is based upon one of the following criteria: i) maximising a stalling angle of attack of the aircraft or ii) maximising the lift coefficient of the wing or iii) moving wing stall to a most benign location on the wing.

15. A method according to claim 13, wherein the aircraft comprises a wing with a wing leading edge and a wing trailing edge, and an array of moveable flight control surfaces attached along the wing trailing edge, each flight control surface having a trailing edge with a moveable tab attached at the flight control surface trailing edge;
- one or more flight control surface drive systems for moving the flight control surfaces with respect to the wing trailing edge;
- tab drive systems for moving the tabs with respect to the flight control surface trailing edges;
- one or more aircraft angle of attack sensors; and
- a flight control system coupled to the one or more aircraft angle of attack sensors, the one or more flight control surface drive systems, and the tab drive systems, and
- wherein the flight control system stores a set of angular deflections for the tabs for deflecting at least some of the tabs upwardly with respect to their respective flight control surfaces when the aircraft angle of attack reaches a threshold.

\* \* \* \* \*